Patented Mar. 7, 1950

2,499,848

UNITED STATES PATENT OFFICE 2,499,848

ESTERS OF 3,5,5-TRIMETHYL-1-HEXANOL

Willard E. Catlin and Benjamin W. Howk, Wilmington, Del., assignors to E. I. du Pont de Nemours & Company, Wilmington, Del., a corporation of Delaware No Drawing. Application January 13, 1947, Serial No. 721,884

4 Claims. (Cl. 260—485)

This invention relates to new compositions of matter and more particularly to a new class of esters.

Numerous esters of straight and branched chain alcohols with various mono- and polycarboxylic acids are known and have been used in many applications. However, the known esters are not entirely satisfactory as lubricants. For example, the viscosity and viscosity index of 2-ethylhexyl adipate are not as high as desired for a synthetic lubricant for use in certain specific applications.

It is an object of this invention to provide a new class of esters. A further object of this invention is to provide new lubricants comprising esters having improved lubricating properties. A still further object is to provide esters having a high viscosity and high viscosity index which make them particularly useful as synthetic lubricants. Other objects will appear hereinafter.

These objects are accomplished by the following invention which comprises esters of 3,5,5-trimethyl-1-hexanol with aliphatic carboxylic acids. These new esters of 3,5,5-trimethyl-1-hexanol can be prepared by reacting the alcohol with an aliphatic carboxylic acid or its anhydride. Thus the 3,5,5-trimethyl-1-hexanol can be reacted with the aliphatic carboxylic acid or its anhydride at ordinary or elevated temperature in the presence or absence of an esterification catalyst to produce the new esters of this invention. The esters of this invention can also be prepared by the ester interchange method, i. e., by reacting 3,5,5-trimethyl-1-hexanol with an ester of the desired aliphatic acid with an alcohol having a lower boiling point than the trimethylhexanol. The aliphatic dicarboxylic acid esters of 3,5,5-trimethyl-1-hexanol have especially valuable properties making them particularly useful as synthetic lubricants. Of these, the esters of 3,5,5-trimethyl-1-hexanol with aliphatic dicarboxylic acids having the carboxyl groups separated by 0 to 10 carbon atoms are the most useful as synthetic lubricants.

When the reaction is to be effected with an acid, the alcohol is preferably employed in a slight excess, for example from 5 to 10% over the amount stoichiometrically equivalent to the amount of acid being used, and means are employed for removing the water formed, in order to obtain maximum yields of the desired ester. Reaction temperatures ranging from 80° C. to 250° C. can be employed, the exact temperature depending on the particular acid and esterification procedure being used.

A procedure which is particularly suitable for the preparation of esters of dicarboxylic acids involves heating a 5 to 10% excess of 3,5,5-trimethyl-1-hexanol with the aliphatic dicarboxylic acid in the presence of from 0.1% to 2%, based on the weight of reactants, of an esterification catalyst, such as sulfuric acid, p-toluenesulfonic acid, hydrogen chloride, and the like, and in the presence of an inert liquid, such as benzene or ethylene dichloride, which forms an azeotrope with the water formed in the reaction, and distilling out the azeotrope formed. This procedure is preferably carried out in apparatus in which the water can be continuously separated from the condensed azeotrope and the carrier liquid returned to the reaction mixture. The esterification is continued under these conditions until the theoretical amount of water has been removed.

The resulting ester is then purified by washing the reaction mixture with water or dilute alkaline solution to remove any unreacted acid. The washed product is then isolated by distillation at atmospheric pressure or at reduced pressure, depending on the boiling point. Volatile impurities can be removed from the reaction mixture without distillation of the ester by treatment with a current of steam.

The 3,5,5-trimethyl-1-hexanol used in the practice of this invention can be prepared as follows: 125 parts of commercial diisobutylene is charged into a silver-lined reaction vessel with 10 parts of a reduced cobalt catalyst and reacted with a mixture of equal parts of carbon monoxide and hydrogen at 135–160° C. and 1100–1800 pounds per square inch pressure for 2 hours. After filtering off the catalyst, distillation of the reaction mixture yields 40–65% of the theoretical amount of 3,5,5-trimethylhexanol boiling at 82–83° C. at 35 mm. Hydrogenation of this aldehyde for 2 to 4 hours at 150° C. in 50% dioxane solution in the presence of 8% of nickel-on-kieselguhr catalyst gives a substantially quantitative yield of 3,5,5-trimethyl-1-hexanol.

This invention is further illustrated by the following examples in which parts are given by weight, unless otherwise specified.

*Example I*

This example describes the preparation of a 3,5,5-trimethyl-1-hexanol ester of an aliphatic dicarboxylic acid.

A mixture of 48.5 parts of 3,5,5-trimethyl-1-hexanol, 24.6 parts of adipic acid, 53 parts of benzene and 0.9 part of concentrated sulfuric acid is heated in a distillation apparatus provided with a reflux condenser and a separator which continuously separates the water from the benzene-water azeotrope and returns the benzene to the reaction mixture. After refluxing for 4 hours, the reaction mixture is washed with water and a rapid current of steam passed through it for one hour to remove steam-volatile materials and to effect the hydrolysis of traces of sulfuric acid reaction products. It is then washed with water and dried in a stream of carbon dioxide for one hour at 150° C. A yield of 65 parts (97% of the theoretical) of di(3,5,5-trimethyl-1-hexyl) adipate is obtained.

*Example II*

This example describes the preparation and properties of a 3,5,5-trimethyl-1-hexanol ester of another aliphatic dicarboxylic acid.

Two hundred and two parts of sebacic acid, 295 parts of 3,5,5-trimethyl-1-hexanol, and 2 parts of p-toluenesulfonic acid are refluxed in 320 parts of anhydrous benzene under a still-head designed to automatically separate the water from the condensed benzene-water azeotrope. After 18 hours, the theoretical amount of water, 36 parts, is collected in the separator. The cooled residue in the reaction vessel is washed with approximately 100 parts of a 5% aqueous sodium carbonate solution and then twice with water. After drying over anhydrous sodium sulfate, the volatile solvent is removed by distillation on a steam bath. The residue is then distilled in a falling-film, short-path still at pressures varying between 0.005 and 0.01 mm., the temperatures on the heated surface not being recorded. The total yield of distilled di-(3,5,5-trimethyl-1-hexyl) sebacate, having a refractive index of $n_D^{25}=1.4488$, is 366 parts.

*Example III*

This example describes the preparation and properties of a 3,5,5-trimethyl-1-hexanol ester of an aliphatic monocarboxylic acid.

A mixture of 144 parts of 3,5,5-trimethyl-1-hexanol, 150 parts of methyl methacrylate (50% excess), 400 parts of dry benzene, and 10 parts of hydroquinone is charged into a glass reaction vessel fitted with a still-head designed to permit partial take-off of condensed vapors. Distillation is started and sufficient benzene is distilled out to dry completely the reactants and apparatus, about 50 parts of distillate being sufficient for this. Ten parts of p-toluenesulfonic acid is then added to the mixture and distillation is continued at a high reflux ratio. After 6 hours, an additional 5 parts each of hydroquinone and p-toluenesulfonic acid are added, and the distillation continued. Over a total period of 9 hours there is collected a distillate having a boiling range of 58–79° C. and containing approximately the theoretical amount (32 parts) of methanol (as determined by water dilution of the distillate). The residue in the distillation vessel is cooled in ice, washed with about 300 parts of a 5% aqueous sodium hydroxide solution, and then washed four times with cold water. The organic layer is dried over anhydrous sodium sulfate and flash-distilled in a small still. The product distilling up to 110° C. at 5 mm. is redistilled through an efficient fractionating column. One hundred thirty-two parts of redistilled 3,5,5-trimethyl-1-hexyl methacrylate is obtained. This ester has a boiling point of 67° C. at 0.5 mm. and 73° C. at 0.9 mm., and a refractive index $n_D^{25}=1.4370$.

The esters included by this invention are esters of 3,5,5-trimethyl-1-hexanol with any aliphatic mono- or poly-carboxylic acid. The acid may be saturated or unsaturated, and may contain substituent groups such as alkoxy, aryloxy, halogeno and the like, although aliphatic carboxylic acids containing solely carbon and hydrogen atoms except for the carboxyl groups are preferred.

Additional specific examples of esters of 3,5,5-trimethyl-1-hexanol are the esters of acetic, mono-choloracetic, trichloroacetic, butyric, methoxyacetic, phenoxyacetic, pimelic, suberic, succinic, maleic, tricarballylic, and the like acids. In the case of esters of polybasic acids, all or only part of the carboxyl groups can be esterified with 3,5,5-trimethyl-1-hexanol. In the case of polybasic esters only partially esterified with 3,5,5-trimethyl-1-hexanol, the remaining carboxyl groups can be free or can be esterified with other alcohols.

The esters of 3,5,5-trimethyl-1-hexanol with aliphatic dicarboxylic acids are very suitable for use as synthetic lubricants because of their unusually high viscosity index. This is an especially desirable characteristic in lubricants since esters having the highest values for viscosity index are the most suitable. The unusual and unexpected viscosity characteristics which make the 3,5,5-trimethylhexyl esters of aliphatic dibasic acids especially suitable for use as lubricants are illustrated by the following data for the esters of Examples I and II in comparison with the corresponding data for the esters of the same acids with related branched chain alcohols.

*Table I*

| Ester | Viscosity [1] at— | | Viscosity Index [2] |
|---|---|---|---|
| | 100° F. | 210° F. | |
| Di (3,5,5-trimethylhexyl) adipate | 72.76 | 37.9 | 155 |
| Di (2-ethylhexyl) adipate | 52.6 | 34.2 | 127.7 |
| Di (3,5,5-trimethylhexyl) sebacate | 94.5 | 41.3 | 161 |
| Di (2-ethylhexyl) sebacate | 67.8 | 36.6 | 154 |

[1] Viscosity in Saybolt Universal seconds.
[2] Viscosity index calculated as described in A. S. T. M. Standards 1942), part III, page 242, method D567-41.

The trimethylhexyl methacrylate of Example III can be polymerized by conventional methods into polymers having valuable properties. For example, polymeric trimethylhexyl methacrylate prepared by the bulk polymerization at 50° C. for 16 hours of the ester of Example III in the presence of 0.2% benzoyl peroxide catalyst is particularly useful as an additive for conventional lubricating oils. This polymer imparts to such oils a desirable increased viscosity and viscosity index. This is illustrated by the following data showing the viscosity characteristics of two commercial lubricating oils and of the same oils containing 2% (by weight) of polymeric 3,5,5-trimethyl-1-hexyl methacrylate.

*Table II*

| Type of Oil | Per Cent Poly-3,5,5-trimethyl-1-hexyl methacrylate Modifier | Viscosity [1] at— | | Viscosity Index [2] |
|---|---|---|---|---|
| | | 100° F. | 210° F. | |
| Paraffin base oil (S. A. E. 20) | 0 | 314 | 53.3 | 99 |
| Same as above | 2 | 777 | 118.7 | 138 |
| Commercial naphthenic base oil (S. A. E. 10W) | 0 | 111 | 38.5 | 8.6 |
| Same as above | 2 | 470 | 85.9 | 143 |

[1] Viscosity in Saybolt Universal seconds.
[2] Viscosity index calculated as described in A. S. T. M. Standards (1942), part III page 242, method D567–41.

We claim:
1. An aliphatic carboxylic acid ester of 3,5,5-trimethyl-1-hexanol.
2. An aliphatic dicarboxylic acid ester of 3,5,5-trimethyl-1-hexanol.
3. An ester of 3,5,5-trimethyl-1-hexanol and an aliphatic dicarboxylic acid having the carboxyl groups separated by 0 to 10 carbon atoms.
4. The chemical compound, di(3,5,5-trimethylhexyl) adipate.

WILLARD E. CATLIN.
BENJAMIN W. HOWK.

REFERENCES CITED

The following references are of record in the file of this patent:

UNITED STATES PATENTS

| Number | Name | Date |
|---|---|---|
| 2,091,241 | Kvalnes | Aug. 24, 1937 |
| 2,417,281 | Wasson et al. | Mar. 11, 1947 |